United States Patent
Tsuchiya

(10) Patent No.: US 12,225,295 B2
(45) Date of Patent: Feb. 11, 2025

(54) IMAGE CAPTURE APPARATUS AND CONTROL METHOD THEREFOR

(71) Applicant: CANON KABUSHIKI KAISHA, Tokyo (JP)

(72) Inventor: Hidetaka Tsuchiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 105 days.

(21) Appl. No.: 18/177,360

(22) Filed: Mar. 2, 2023

(65) Prior Publication Data

US 2023/0300469 A1    Sep. 21, 2023

(30) Foreign Application Priority Data

Mar. 16, 2022   (JP) ................................ 2022-041763

(51) Int. Cl.
*H04N 23/698*   (2023.01)
*H04N 5/262*   (2006.01)
*H04N 23/55*   (2023.01)
*H04N 23/68*   (2023.01)

(52) U.S. Cl.
CPC ......... *H04N 23/698* (2023.01); *H04N 5/2628* (2013.01); *H04N 23/55* (2023.01); *H04N 23/6812* (2023.01)

(58) Field of Classification Search
CPC .... H04N 23/698; H04N 23/683; H04N 25/61; H04N 23/45; H04N 23/55; H04N 23/675; H04N 23/6811; H04N 23/70; H04N 23/71
USPC ......................................................... 348/38
See application file for complete search history.

(56) References Cited

U.S. PATENT DOCUMENTS

| 11,128,764 | B2 | 9/2021 | Kuwabara |
| 2019/0260928 | A1* | 8/2019 | Kunishige ............ H04N 23/675 |
| 2019/0356792 | A1 | 11/2019 | Kuwabara |
| 2020/0068098 | A1 | 2/2020 | Tadano |

(Continued)

FOREIGN PATENT DOCUMENTS

| EP | 3627218 A1 | 3/2020 |
| JP | 2019-205161 A | 11/2019 |
| JP | 2019-205161 A1 | 11/2019 |

OTHER PUBLICATIONS

Jul. 24, 2023 European Official Action in European Patent Appln. No. 23160919.9.

(Continued)

*Primary Examiner* — Masum Billah
(74) *Attorney, Agent, or Firm* — Venable LLP

(57) ABSTRACT

An image capture apparatus that generates an omnidirectional image using imaging lenses is disclosed. The apparatus detects an orientation of the image capture apparatus. The apparatus identifies, when the image capture apparatus is in an operation mode for generating a first image with a smaller field of view than an omnidirectional image, an area to be captured required to generate the image on a basis of a difference between a reference orientation and a current orientation of the image capture apparatus. The apparatus, when the image capture apparatus is in the operation mode, enables image capture using an imaging lens, from among the imaging lenses, required to capture the area to be captured and disable image capture using an imaging lens, from among the imaging lenses, not required to capture the area to be captured.

13 Claims, 8 Drawing Sheets

(56) References Cited

U.S. PATENT DOCUMENTS

2020/0162671 A1* 5/2020 Toda ................... H04N 5/2628
2020/0304710 A1* 9/2020 Boyce ................. H04N 21/816

OTHER PUBLICATIONS

Mar. 20, 2024 Indian Official Action in Indian Patent Appln. No. 202344015985.

* cited by examiner

FIG. 3A
FIG. 3B
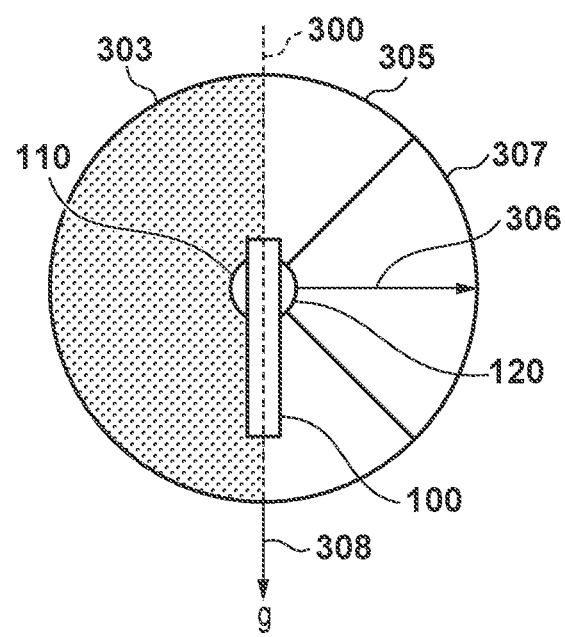
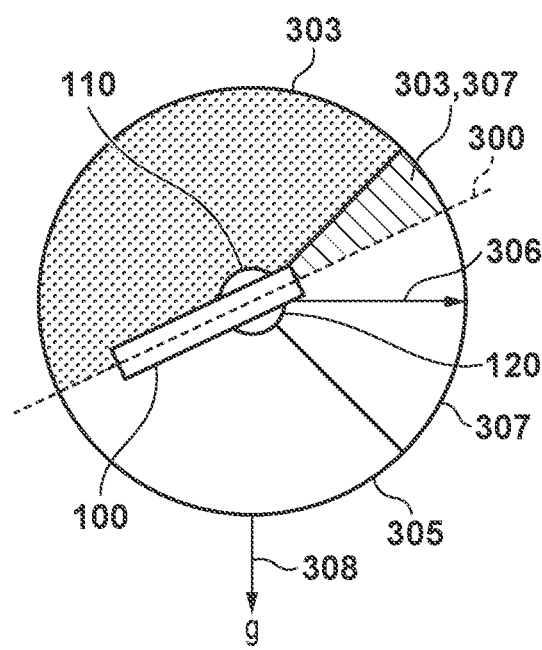

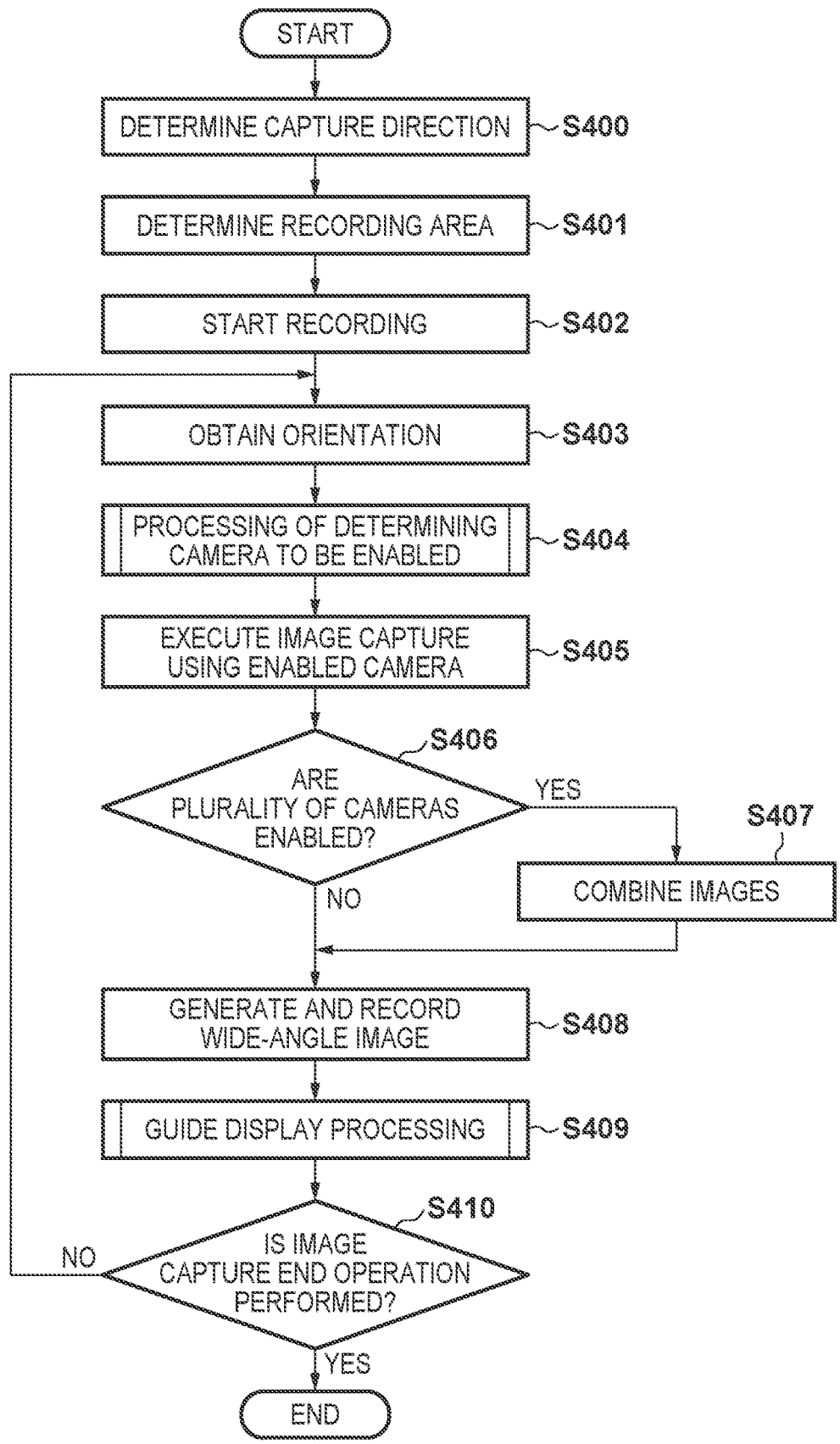

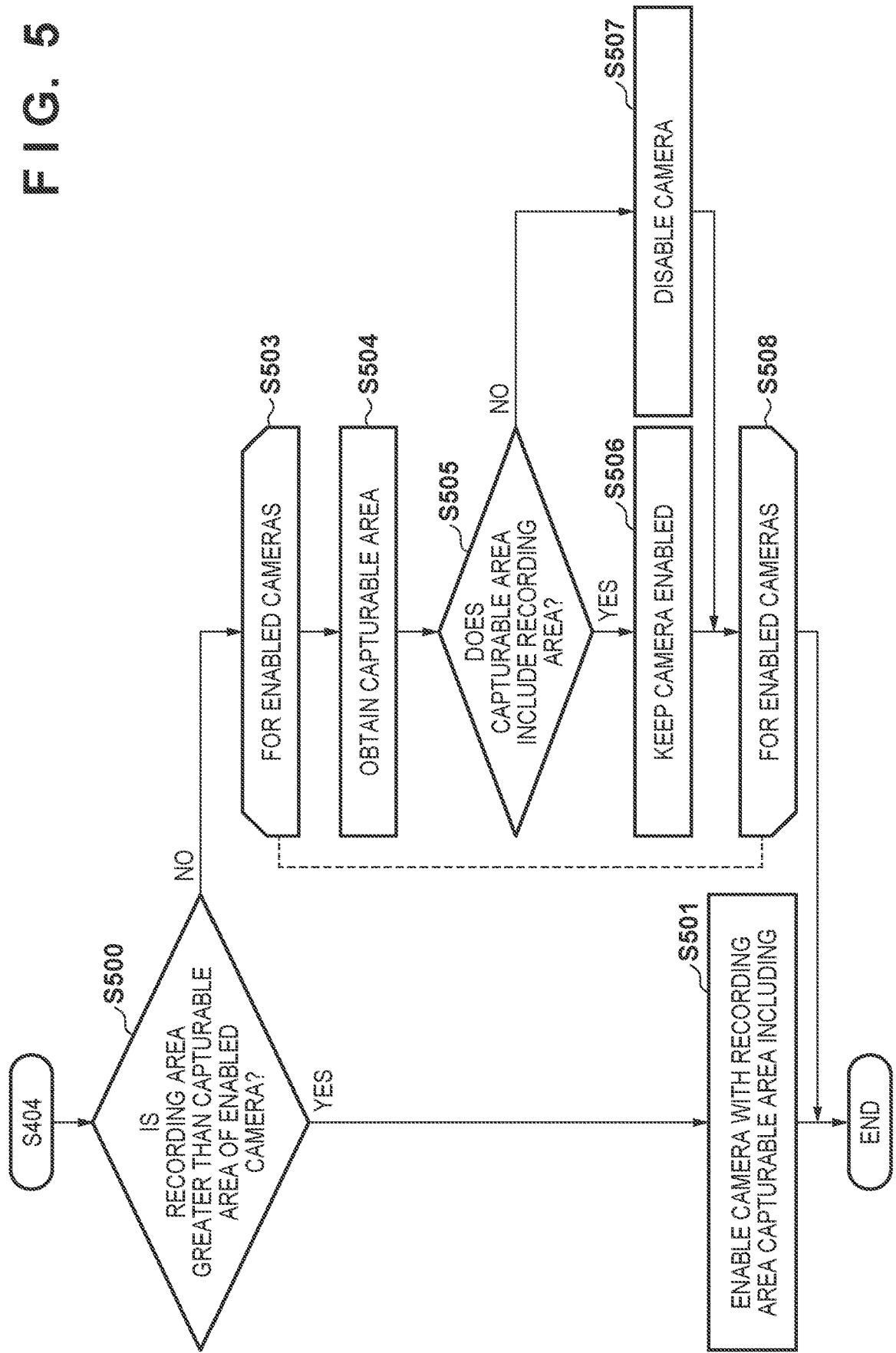

IMAGE CAPTURE APPARATUS AND CONTROL METHOD THEREFOR

BACKGROUND OF THE INVENTION

Field of the Invention

The present invention relates to an image capture apparatus and a control method therefor and particularly relates to an image capture apparatus that can capture an omnidirectional image and a control method therefor.

Description of the Related Art

A known image capture apparatus can capture an omnidirectional image with a 360-degree field of view (see Japanese Patent Laid-Open No. 2019-205161). Such an image capture apparatus is referred to as a 360-degree camera or an omnidirectional camera.

For example, a 360-degree camera provided with two circular fisheye lenses with a 180-degrees field of view includes a function for cropping a rectangular region from an image captured using only one lens and generating an image like one captured with a wide-angle lens with a field of view that is less than 180 degrees.

In this case, electronic image stabilization can be performed irrespective of the rotation angle for the rotation (movement in the roll direction) of the camera about the optical axis. However, for rotation (movement in the pitch and yaw direction) of the camera about the axes orthogonal to the optical axis, there are restrictions on the rotation angle for which image stabilization can be performed.

SUMMARY OF THE INVENTION

According to an embodiment of the present invention, provided is an image capture apparatus that can generate an omnidirectional image using a plurality of lenses and a control method therefor that can enhance image stabilization when generating an image with a smaller field of view than an omnidirectional image.

According to an aspect of the present invention, there is provided an image capture apparatus that generates an omnidirectional image using a plurality of imaging lenses, comprising: one or more processors that execute a program stored in a memory and thereby function as: a detecting unit configured to detect an orientation of the image capture apparatus; an identifying unit configured to, when the image capture apparatus is in an operation mode for generating a first image with a smaller field of view than an omnidirectional image, identify an area to be captured required to generate the image on a basis of a difference between a reference orientation and a current orientation of the image capture apparatus detected by the detecting unit; and a control unit configured to, when the image capture apparatus is in the operation mode, enable image capture using an imaging lens, from among the plurality of imaging lenses, required to capture the area to be captured and disable image capture using an imaging lens, from among the plurality of imaging lenses, not required to capture the area to be captured.

According to another aspect of the present invention, there is provided a control method for an image capture apparatus that can generate an omnidirectional image using a plurality of imaging lenses, comprising: detecting an orientation of the image capture apparatus; when the image capture apparatus is in an operation mode for generating a first image with a smaller field of view than an omnidirectional image, identifying an area to be captured required to generate the image on a basis of a difference between a reference orientation and a current orientation of the image capture apparatus detected in the detecting; and when the image capture apparatus is in the operation mode, enabling image capture using an imaging lens, from among the plurality of imaging lenses, required to capture the area to be captured and disabling image capture using an imaging lens, from among the plurality of imaging lenses, not required to capture the area to be captured.

According to a further aspect of the present invention, there is provided a non-transitory computer-readable medium storing a program for causing a computer included in an image capture apparatus that can generate an omnidirectional image using a plurality of imaging lenses to function as: a detecting unit configured to detect an orientation of the image capture apparatus; an identifying unit configured to, when the image capture apparatus is in an operation mode for generating a first image with a smaller field of view than an omnidirectional image, identify an area to be captured required to generate the image on a basis of a difference between a reference orientation and a current orientation of the image capture apparatus detected by the detecting unit; and a control unit configured to, when the image capture apparatus is in the operation mode, enable image capture using an imaging lens, from among the plurality of imaging lenses, required to capture the area to be captured and disable image capture using an imaging lens, from among the plurality of imaging lenses, not required to capture the area to be captured.

Further features of the present invention will become apparent from the following description of exemplary embodiments (with reference to the attached drawings).

BRIEF DESCRIPTION OF THE DRAWINGS

FIGS. 3A and 3B are schematic diagrams for describing operational controls in an embodiment.

FIG. 4 is a flowchart relating to the operations of a digital camera according to an embodiment.

FIG. 5 is a flowchart relating to the operations of a digital camera according to an embodiment.

DESCRIPTION OF THE EMBODIMENTS

Figure 1A:
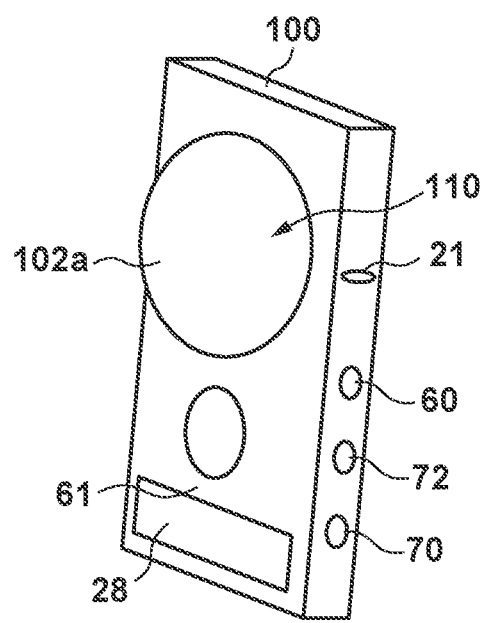
FIGS. 1A to 1C are diagrams relating to a digital camera representing an example of an image capture apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Note that in the embodiments described below, the present invention is embodied as an image capture apparatus such as a digital camera. However, the present invention can be implemented with any electronic device with an image capture function. Examples of such an electronic device include video cameras, computer devices (personal computers, tablet computers, media players, PDAs, and the like), mobile phones, smartphones, game consoles, robots, drones, and drive recorders. These are examples, and the present invention can be implemented with other electronic devices.

Figure 1B:
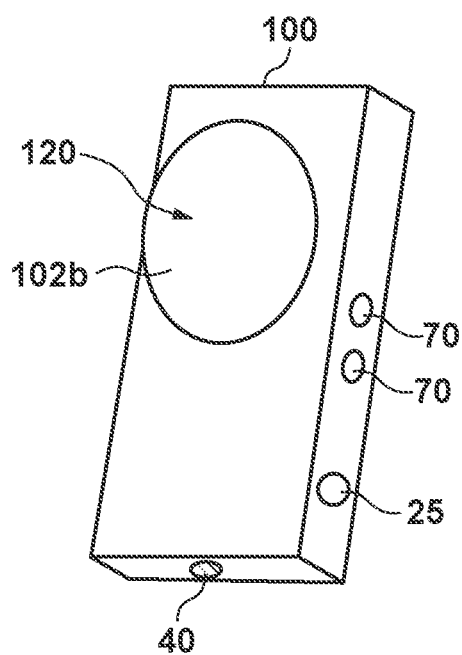
Figure 1C:
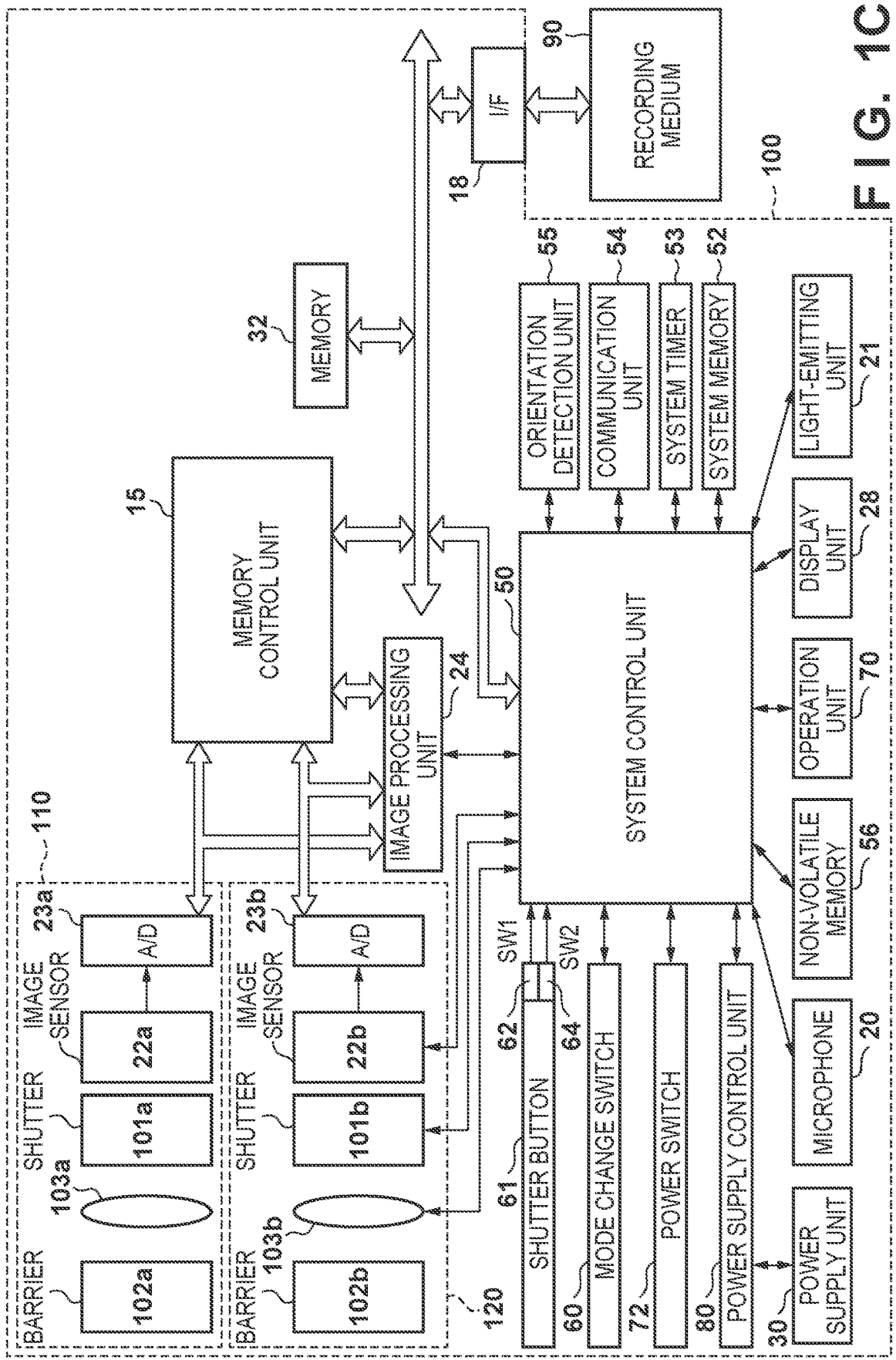

FIGS. 1A and 1B are perspective views illustrating an example of the appearance of a digital camera 100 representing an example of an image capture apparatus according to an embodiment of the present invention. Herein, the side where a shutter button 61 is provided corresponds to the front side of the digital camera 100. Thus, the front side of the example configuration is illustrated in FIG. 1A, and the rear side is illustrated in FIG. 1B. Also, FIG. 1C is a block diagram illustrating an example of the functional configuration of the digital camera 100.

Hereinafter, an exemplary configuration of the digital camera 100 will be described using FIGS. 1A to 1C. The digital camera 100 includes imaging lenses 103a and 103b, which are circular fisheye lenses with a 180-degree field of view, on the front side and the rear side, respectively. The imaging lenses 103a and 103b, for example, include the same optical axis and are configured to have capture directions that are 180 degrees different from one another. In the present specification, the capture direction of the imaging lens 103a provided on the front side of the digital camera 100 is referred to as the front, and the capture direction of the imaging lens 103b provided on the rear side of the digital camera 100 is referred to as the rear.

The digital camera 100 is an omnidirectional camera or a 360-degree camera that can generate an omnidirectional image with a 360-degree horizontal field of view by combining or stitching together images formed by the imaging lenses 103a and 103b. Note that the omnidirectional image may be a 360-degree image and may have a vertical field of view of less than 360 degrees like a 180-degree image. In the present embodiment, the two imaging lenses 103a and 103b are circular fisheye lens with a horizontal field of view of 180 degrees or greater, and the digital camera 100 can generate a 360-degree image.

Note that in this example, the two imaging lenses 103a and 103b cover a horizontal field of view of 360 degrees or greater, but a configuration may be used in which three or more imaging lenses with different capture directions cover a horizontal field of view of 360 degrees or greater.

The digital camera 100 includes a plurality of image capture units including a front camera 110 that captures images of the front and a rear camera 120 that captures images of the rear. The front camera 110 includes the imaging lens 103a and a barrier 102a (protective member) provided on the front side of the imaging lens 103a. The barrier 102a is a transparent member with a hemispherical shape, for example. The imaging lens 103a includes a focus lens that can move in the optical axis direction. A shutter 101a also functions as a diaphragm. The imaging lens 103a forms an optical image on an imaging surface of an image sensor 22a.

The image sensor 22a, for example, may be a known CCD or CMOS color image sensor including a primary color Bayer array color filter. The image sensor 22a includes a pixel array including a plurality of pixels in a two-dimensional array and a peripheral circuit for reading signals from the pixels. The pixels accumulate a charge corresponding to the incident light via photoelectric conversion. By reading a signal including voltage corresponding to the amount of charge accumulated in the exposure period from each pixel, a pixel signal group (analog image signal) representing an optical image formed on the imaging surface is obtained. An A/D converter 23a converts an analog image signal read out from the image sensor 22a into a digital image signal (image data).

Also, the front camera 110 includes a mechanism for moving the focus lens, a mechanism for detecting the position of the focus lens, and a mechanism for driving the shutter 101a. Note that the front camera 110 may include a movement mechanism for the image sensor 22a for implementing an optical blur correction function and/or a movement mechanism for a shift lens included in the imaging lens 103a.

The rear camera 120 has the same configuration as the front camera 110, and thus description of the components is omitted. Note that hereinafter, the image sensors 22a and 22b are collectively referred to as the image sensors 22. This also applies to other components included in the front camera 110 and the rear camera 120. In the present embodiment, since a configuration is used in which one image capture unit uses one imaging lens, selectively using an image capture unit and selectively using an imaging lens have the same meaning. Thus, a description relating to enabling and disabling an image capture unit (camera) can be read as enabling and disabling image capture via an imaging lens. However, the present invention can be applied to configurations in which one image capture unit simultaneously uses a plurality of imaging lenses or switches between using a plurality of imaging lenses.

The image data output from the A/D converter 23 is written on memory 32 via both an image processing unit 24 and a memory control unit 15 or via only the memory control unit 15.

The memory 32 is used as a buffer for the image data, work memory of the image processing unit 24, video memory of a display unit 28, and the like.

The image processing unit 24 applies predetermined image processing to the image data output by the A/D converter 23 or the memory control unit 15 or stored in the memory 32 and acquires or generates signals corresponding to the application, image data, various types of information. The image processing unit 24 may be, for example, a dedicated hardware such as an Application-Specific Integrated Circuit (ASIC) configured to implement a specific function. Alternatively, the image processing unit 24 may have a configuration for implementing a specific function by the processor, such as a Digital Signal Processor (DSP) or a Graphics Processing Unit (GPU), executing a piece of software.

The image processing to be applied to the image data by the image processing unit 24 includes, for example, preprocessing, color interpolation processing, correction processing, detection processing, data modification processing, evaluation value calculation processing, special effects processing, and the like.

Preprocessing may include signal amplification, reference level adjustment, defective pixel correction, and the like.

Color interpolation processing is processing executed when the image sensors 22 are provided with a color filter for interpolating values of color components that are not included in the pieces of pixel data forming the image data. Color interpolation processing is also referred to as demosaic processing.

Correction processing may include various processing including white balance adjustment, tone correction, correction (image restoration) of image degradation caused by an optical aberration in the imaging lenses 103 (103a and 103b), color correction, and the like. Correction processing also includes processing for correcting significant distortion at the peripheral portion of an ultra-wide-angle lens such as a circular fisheye lens.

Detection processing may include processing for detecting a feature area (for example, a face area or a human body area) or movement thereof, processing for recognizing a person, and the like.

Data modification processing may include processing including region cropping (trimming), combining, scaling, encoding and decoding, header information generation (data file generation), and the like. Data modification processing also includes generating image data for display and image data for recording.

Evaluation value calculation processing may include processing including generating signals or evaluation values that are used in automatic focus detection (AF), generating evaluation values that are used in automatic exposure control (AE), and the like.

Special effects processing may include processing including adding a blur effect, changing color tone, relighting, and the like.

Note that these are examples of the processing that can be applied by the image processing unit 24, and are not intended to limit the processing applied by the image processing unit 24. Also, image processing that can be applied by the image processing unit 24 may be executed by a system control unit 50.

In the present embodiment, the image processing unit 24 stitches together two circular fisheye images captured by the front camera 110 and the rear camera 120 and generates a 360-degree image. The generated 360-degree image is transformed into an image using equidistant cylinder transformation, and the positions of the pixels can be associated with the coordinates of the 360-degree surface.

Also, the image processing unit 24 crops a region from the data of the circular fisheye image, applies distortion correction, and the like and generates image data for live view display in a rectangular shape suitable for the display unit 28 or an external display apparatus.

The system control unit 50, for example, is a processor (CPU, MPU, microprocessor, or the like) that can execute programs. The system control unit 50, by loading a program stored in a non-volatile memory 56 onto a system memory 52 and executing the program, controls the operations of the functional blocks of the digital camera 100 and implements the functions of the digital camera 100.

The non-volatile memory 56 is electrically rewritable and stores a program executed by the system control unit 50, various setting values of the digital camera 100, GUI data, and the like. The system memory 52 is used as the main memory when the system control unit 50 executes a program. Note that the memory 32 and the system memory 52 may be different areas within a continuous memory space.

The shutter button 61 includes a switch SW1 62 that turns ON with a half press and a switch SW2 64 that turns ON with a full press. The system control unit 50 recognizes ON at the switch SW1 62 as a still image capture preparation instruction and ON at the switch SW2 64 as a still image capture start instruction. When ON at the switch SW1 62 is detected, the system control unit 50 uses a signal, evaluation value, or the like generated by the image processing unit 24 and executes automatic focus detection (AF) and automatic exposure control (AE) for the front camera 110 and/or the rear camera 120. Also, when ON at the switch SW2 64 is detected, the system control unit 50 controls the shutters 101 in according with the exposure condition determined by AE processing, captures a still image, and executes recording processing. The still image data for recording generated by the image processing unit 24 is temporarily stored in the memory 32 before being recording on a recording medium 90 via an I/F 18 by the system control unit 50.

Note that the shutter button 61 may include only one switch. In this case, when ON at the switch is detected, the system control unit 50 continuously executes image preparation operations and image capture processing.

The operation mode of the digital camera 100 can be changed by the user operating a mode change switch 60. The operation modes include, for example, a mode for capturing a 360-degree image, a mode for capturing a typical wide-angle image with a horizontal field of view of less than a 180-degree (referred to as crop mode), a playback mode, a mode for operating in cooperation with an external apparatus, and the like. Note that the mode for capturing a wide-angle image may include a plurality of modes (90-degree mode, 150-degree mode, and the like) corresponding to the horizontal field of view.

Note that the operation mode can be selected via a combination of an operation of the mode change switch 60 and an operation of another operation member. For example, the mode change switch 60 may be used to select the broad category of the operation mode, and then, from the more specific categories displayed on the display unit 28, the operation mode may be selected.

A power switch 72 is a switch for instructing to turn ON or OFF the power supply of the digital camera 100. The power supply control unit 80 controls these operations.

The power supply control unit 80 includes a battery detection circuit, a DC-DC converter, a switch circuit for switching between functional blocks that supply power, and the like and controls the power supply to the components of the digital camera 100 from a power supply unit 30, which may be a battery or an AC adapter. The power supply control unit 80 detects the type of the power supply unit 30. Also, when the power supply unit 30 is a battery, the power supply control unit 80 detects the type and remaining battery amount. The power supply control unit 80 can change the components that supply power and the power supplied in accordance with the state of the power switch 72 and control by the system control unit 50.

A microphone 20 is pointed to the outside of the digital camera 100 and outputs audio signals to the system control unit 50. When moving images are recording, image data and audio data are recorded.

An operation unit 70 is a generic term for an input device assembly (buttons, switches, dials, and the like) besides the mode change switch 60, the shutter button 61, and the power switch 72. This includes a moving image recording switch, a menu button, a directional key, an enter key, and the like. When the display unit 28 is a touch display, the operation unit 70 may also be constituted by a touch-operable software button or key.

The display unit 28 is a liquid crystal display (LCD), for example. The display unit 28 may not be a touch display. The display unit 28 displays characters and images. By displaying moving images continuously captured immediately on the display unit 28, the display unit 28 can function as an electronic viewfinder (EVF). Moving images displayed with a display apparatus functioning as an EVF are referred to as live view images. Note that by outputting a live view image to an external apparatus connected to a communication unit 54, a display apparatus included in an external apparatus can function as an EVF.

A light-emitting unit 21 is a light-emitting diode (LED) that notifies the user of the status of the digital camera 100 and the like via the pattern or color of the emitted light.

A fixing portion 40 (FIG. 1B) provided on the bottom side of the digital camera 100 is a threaded hole where a tripod is attached, for example.

A system timer 53 outputs the time of an internal clock and measures time in response to a request from the system control unit 50.

The communication unit 54 is an interface for wired or wireless communication with an external apparatus, such as an electronic device described below, an external display apparatus, or the like. The communication unit 54 is compatible with one or more wired or wireless communication standards and includes a connector, a transceiver, and the like appropriate for that standard. Representative standards the communication unit 54 may support include, but are not limited to, USB, HDMI (registered trademark), Bluetooth (registered trademark), wireless LAN, and the like.

An orientation detection unit 55, for example, includes a gyro sensor and an acceleration sensor and outputs signals representing the orientation and movement of the digital camera 100 to the system control unit 50. The orientation of the digital camera 100 is represented by the rotation angles (roll, pitch, and yaw) about angular axes, with the x-axis being parallel with the optical axis, the y-axis extending in the horizontal direction, and the z-axis extending in the vertical direction. The orientation of the digital camera 100 when capturing an image may be associated with the image data and recorded. Also, the detected orientation and movement of the digital camera 100 can be used in image stabilization and tilt correction.

The I/F 18 is an interface for writing data to the recording medium 90, which is a memory card, hard disk, or the like, and for reading data recorded on the recording medium 90. The recording medium 90 may or may not be detachable from the digital camera 100.

Figure 2A:
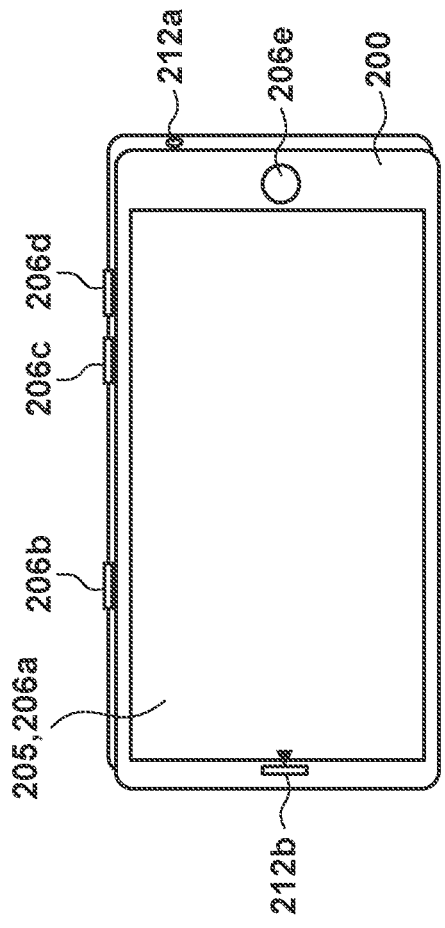
FIGS. 2A and 2B are diagrams relating to a smartphone representing an example of an electronic device according to an embodiment.
Figure 2B:
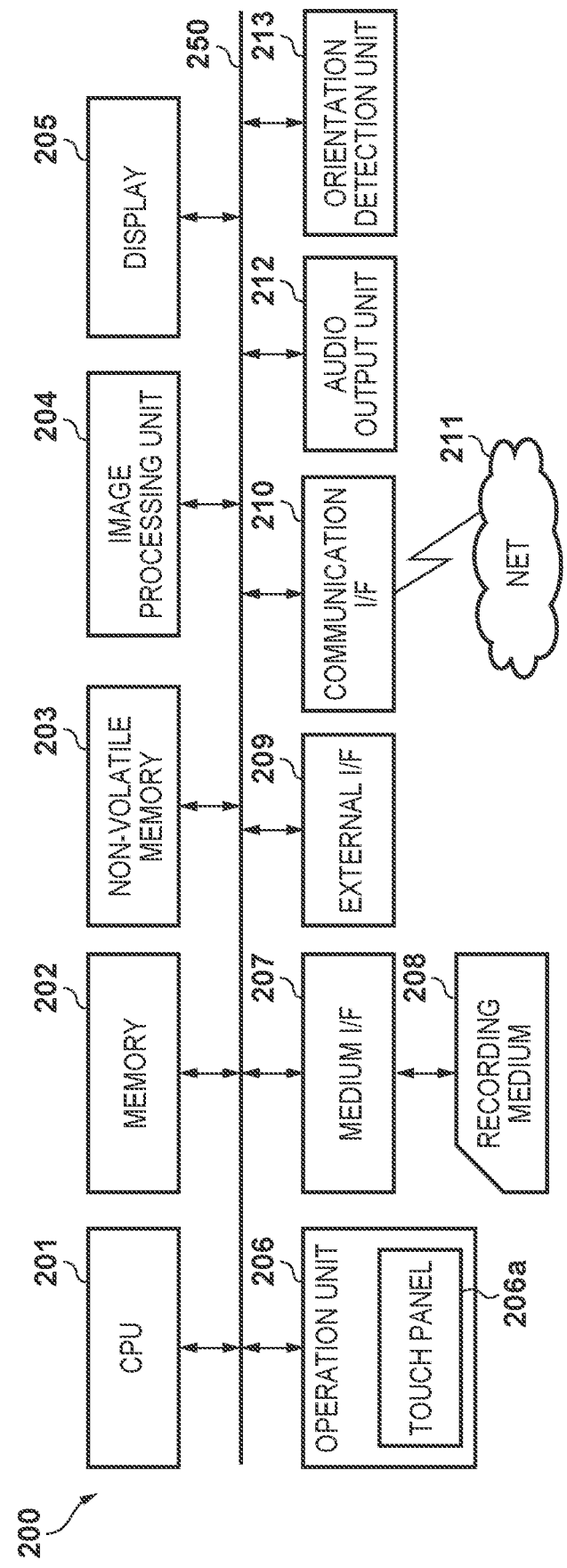

FIGS. 2A and 2B are diagrams of a smartphone 200, which is an example of an external apparatus that can cooperate with the digital camera 100 via communication using the communication unit 54. FIG. 2A is a perspective view illustrating an example of the appearance, and FIG. 2B is a block diagram illustrating an example of the functional configuration. Note that the external apparatus is not limited to a smartphone and it is sufficient that the electronic device can communicate with the digital camera 100 and include a processor that can execute an application for cooperating with the digital camera 100.

The configuration of the smartphone 200 will now be described.

An internal bus 250 connects each block allowing for data to be exchanged in both directions.

A CPU 201 is a processor that can execute programs and, by loading a program stored in a non-volatile memory 203 on a memory 202 and executing the program, controls the operations of the functional blocks of the smartphone 200 and implement the functions of the smartphone 200.

The memory 202 is used as the main memory when the CPU 201 executes a program. A portion of the memory 202 is used as the video memory of a display 205.

The non-volatile memory 203 is electrically rewritable and stores programs (OS and applications) executed by the CPU 201, setting values for the smartphone 200, GUI data, user data, and the like.

The display 205 is an LCD, for example, and is where the OS and applications display images and various types of information. The display 205 is a touch display including a touch panel 206a and can detect a touch operation on the display surface of the display 205. The display 205 may be an external apparatus.

The image processing unit 204 applies image processing to image data stored in the non-volatile memory 203 and a recording medium 208, image data obtained via an external I/F 209, image data obtained via a communication I/F 210, and the like based on control by the CPU 201.

The image processing to be applied to the image data by the image processing unit 204 may be similar to the image processing unit 24 of the digital camera 100. When the smartphone 200 does not include a camera, generation of evaluation values used in AF and AE may not be executed. Also, the image processing that the image processing unit 204 can execute may be executed by the CPU 201.

The image processing unit 204 can generate image data for Virtual Reality (VR) display corresponding to the movement of the smartphone 200 from ultra-wide-angle images (for example, images with a horizontal field of view greater than 180 degrees) such as an omnidirectional image in accordance with control by the CPU 201. VR display is implemented by cropping a region of an area to be captured corresponding to a change in the orientation of the smartphone 200 from an ultra-wide-angle image and displaying the generated cropped image data on the display 205. With VR display, for example, by fixing the display 205 of the smartphone 200 in front of the eyes of the user using goggles or the like, the image displayed changes, tracking the movement of the head of the user. In this manner, the user can experience the feeling of being inside the virtual space represented by the ultra-wide-angle image.

Alternatively, by controlling the image processing unit 204 to crop a region of the same area to be captured from an ultra-wide-angle image to irrespective of the orientation of the smartphone 200, electronic image stabilization can be implemented.

An operation unit 206 is a generic term for an input device assembly the user can use to give instructions to the smartphone 200. Input devices typically included in the smartphone 200 include but are not limited to a button, a switch, and a touch panel. Also, the operation unit 206 may be constituted by a keyboard and mouse communicatively connected to the smartphone 200. Note that in FIG. 2B, the touch panel 206a is illustrated separate to the display 205. However, the touch panel 206a is actually built-in or attached to the display screen of the display 205.

A power button 206b, volume buttons 206c and 206d, and a home button 206e are examples of input devices constituting the operation unit 206. The power button 206b switches the power of the smartphone 200 ON and OFF. The volume buttons 206c and 206d are buttons for increasing or decreasing the volume output from an audio output unit 212. The home button 206e is a button for displaying a specific screen provided by the OS on the display 205.

A medium I/F 207 is an interface for accessing the recording medium 208. When the recording medium 208 is a removable media such as a memory card, for example, the medium I/F 207 includes a slot where the recording medium 208 is inserted/removed. The CPU 201 can write data to the recording medium 208 via the medium I/F 207 and read out data from the recording medium 208.

The external I/F 209 is an interface for wired or wireless communication with an external apparatus, such as the digital camera 100 or an external display apparatus. The external I/F 209 is compatible with one or more wired or wireless communication standards and includes a connector, a transceiver, and the like appropriate for that standard. Representative standards the communication unit 54 may support include, but are not limited to, USB, HDMI (registered trademark), Bluetooth (registered trademark), wireless LAN, and the like.

The communication I/F 210 is an interface for communications via a cellular network 211. The communication I/F 210, for example, may be a communication I/F compliant with a mobile communications standard established by the 3GPP, such as 3G, 4G, or 5G modem.

The audio output unit 212 outputs audio (audio based on moving images or music data, operation sounds, ringtones, various types of notification sounds, and the like). The audio output unit 212 includes an audio output terminal 212a that an earphone or the like can connect to and a speaker 212b but may output audio to an external apparatus via the external I/F.

An orientation detection unit 213, for example, includes a gyro sensor and an acceleration sensor and outputs signals representing the orientation and movement of the smartphone 200 to the CPU 201. The orientation of the smartphone 200 is represented by the rotation angles (roll, pitch, and yaw) about angular axes, with the x-axis being orthogonal to the display screen of the display 205, the y-axis extending in the horizontal direction, and the z-axis extending in the vertical direction. The orientation detected by the orientation detection unit 213 can be used in the VR display described above.

FIGS. 3A and 3B schematically illustrate operation control of the front camera 110 and the rear camera 120 according to the orientation when the digital camera 100 is operating in an operation mode (crop mode) for capturing still images with a horizontal field of view of less than 180 degrees.

FIG. 3A illustrates an example of the orientation (reference orientation) of the digital camera 100 when image capture starts, and FIG. 3B illustrates an example of the orientation of the digital camera 100 during image capture. In the state (upright state) illustrated in FIG. 3A, the roll, pitch, and yaw are all at 0 degrees. Also, FIG. 3B illustrates a state in which, from the state of FIG. 3A, only the pitch (rotation angle about the y-axis) has changed, with the rear camera 120 facing downward.

In crop mode, an image is generated for recording or display by cropping a partial area from an omnidirectional image or an ultra-wide-angle image. When the horizontal field of view of the image generated in crop mode can be covered by one of the imaging lenses, there is no need for image capture using the other lens. This allows only the imaging lens and related circuit required for image capture to be used.

For example, if the horizontal field of view of the image generated in crop mode by the digital camera 100 according to the present embodiment is less than 180 degrees, by enabling only one of the front camera 110 or the rear camera 120, power consumption can be reduced. In this example, the rear camera 120 is used when starting image capture so that the display unit 28 can be viewed when starting image capture. Also, an image with a horizontal field of view of 150 degrees and a vertical field of view of 90 degrees is generated.

Furthermore, electronic image stabilization is executed by changing the crop position of the image so that the same area to be captured as when starting image capture is maintained, even when the orientation of the digital camera 100 changes from the reference orientation (for example, the orientation when starting image capture) during image capture. Hereinafter, the area cropped from the capturable area in crop mode is referred to as a recording area, for the sake of convenience. Note that the use of the image data generated in crop mode is not limited to recording.

The orientation (reference orientation) of the digital camera 100 when starting image capture is an upright state. In this case, an arrow 306 indicates the capture direction (optical axis direction of the imaging lenses 103 (103a and 103b)). Accordingly, of a capturable area 305 (right semicircle) of the rear camera 120, an area 307 indicated by a gray color corresponds to the vertical recording area. Since the front camera 110 is disabled, a capturable area 303 (left semicircle) of the front camera 110 is not captured. The direction of a boundary line 300 between the capturable area 303 of the front camera 110 and the capturable area 305 of the rear camera 120 is aligned with a gravity direction 308.

When the digital camera 100 changes from the orientation illustrated in FIG. 3A to the orientation illustrated in FIG. 3B, to implement image stabilization, cropping an area the same as the recording area 307 when starting image capture is required. However, of the recording area 307, the hatched portion in FIG. 3B is not included in the capturable area 305 of the rear camera 120 and is included in the capturable area 303 of the front camera 110. Thus, image stabilization cannot be implemented with only the image data obtained by the rear camera 120.

In this manner, when image stabilization cannot be implemented with the area to be captured of one camera, the system control unit 50 enables another camera (in this example, the front camera 110) with an area to be captured that includes the area required for image stabilization and executes image capture with the plurality of cameras. Accordingly, even when the digital camera 100 changes to the orientation of FIG. 3B, the recording area 307 can be cropped to allow image stabilization to be implemented.

On the other hand, when image stabilization can be implemented with the area to be captured of one camera, by disabling the other camera, power consumption can be reduced. Note that when the recording area approaches a boundary of the current capturable area, the camera that can capture the area required if the recording area exceeds the capturable area may be enabled. This can help avoid being unable to execute image stabilization while a camera additionally enabled is activated and an image is obtained.

Note that in the example described above using FIGS. 3A and 3B, control is performed according to a change in the orientation in the pitch direction. However, this also applies to a change in the orientation in the yaw direction.

The operations of the system control unit 50 when in crop mode will be further described using the flowchart of FIG. 4. These operations are executed when the digital camera 100 is operating in crop mode, image stabilization is set to enabled, and moving image capture is started. Note that the moving image capture may be for recording or may be for live view display, but in the example described below, the moving image capture is for recording. Step S400 may be executed by, but is not limited to, the operation of a moving image switch in a standby state when capturing for recording or by the detection of an enable image stabilization operation in a standby state when capturing for live view display.

Note that when remote operation by an external apparatus is enabled, step S400 may be executed by a start recording instruction received via the communication unit 54 from an external apparatus.

In step S400, the system control unit 50 obtains the orientation (reference orientation) of the digital camera 100 from the orientation detection unit 55. The system control unit 50 determines the optical axis direction of the rear camera 120 or the front camera 110 as the capture direction on the basis of the obtained orientation. The capture direction is a unidirectional direction that is not affected by changes to the orientation of the digital camera 100 thereafter. The system control unit 50 stores the obtained orientation and the determined capture direction in the system memory 52, for example.

In step S401, the system control unit 50 determines the recording area on the basis of the capture direction determined in step S400 and the settings of the digital camera 100. In this example, in crop mode, the horizontal field of view is selectable and the vertical field of view is constant or determined according to the horizontal field of view. In this example, a horizontal field of view of 150 degrees is selected, and a vertical field of view of 90 degrees is determined.

The system control unit 50 associates the area determined as the recording area from the orientation and capture direction of the digital camera 100 when starting recording and the capturing field of view with the orientation of the digital camera 100 when starting image capture and stores these in the system memory 52. The system control unit 50, for example, can set, as the recording area, a region obtained by mapping a rectangular region with a size based on the horizontal field of view and the vertical field of view, centered on the capture direction, on an omnidirectional image according to the orientation of the digital camera 100. Thus, the recording area corresponds to a specific region in an omnidirectional image the digital camera 100 can generate.

In step S402, the system control unit 50 starts moving image recording operations, and the processing of step S403 onward is continuously executed for each frame.

In step S403, the system control unit 50 obtains the orientation of the digital camera 100 from the orientation detection unit 55.

In step S404, the system control unit 50 determines the camera to enable on the basis of the recording area and a change in the orientation from when starting image capture. This will be described below in detail.

In step S405, the system control unit 50 executes image capture equal to one frame using the enabled camera. Since only the rear camera 120 is enabled when starting image capture, the system control unit 50 executes image capture of one frame using only the rear camera 120. The image processing unit 24 generates image data for recording and image data for display for 1 frame read out from the enabled camera and stores this in the memory 32. Note that the operations relating to determining the image capture conditions and driving the focus lens and image sensor when capturing an image are known and thus not described.

In step S406, the system control unit 50 determines whether or not a plurality of cameras are enabled. This determination corresponds to a determination of whether or not combining images is required. The digital camera 100 according to the present embodiment includes the front camera 110 and the rear camera 120, and if both cameras are enabled, the system control unit 50 executes step S407, and if only one camera is enabled, the system control unit 50 skips step S407 and executes step S408.

In step S407, the system control unit 50 instructs the image processing unit 24 to combine (stitch together) the image data captured by the enabled cameras. In response to the instruction, the image processing unit 24 combines (stitches together) the image data of the current frame stored in the memory 32 and generates data of a combined image with a continuous area to be captured. Note that the image processing unit 24 already knows what kind of positional relationship to stitch together the images obtained by the cameras. The image processing unit 24 stores the combined image data in the memory 32. When the system control unit 50 generates the combined image data, step S408 is executed.

In step S408, the system control unit 50 instructs the image processing unit 24 to crop the image data of the recording area. The system control unit 50, for example, reads out the orientation when starting image capture obtained in step S400 and the orientation obtained in step S403 and the recording area determined in step S401 from the system memory 52 and sends this and the cropping instruction to the image processing unit 24. Note that, instead of orientation information, the position corresponding to the capture direction when starting image capture obtained when determining which camera to enable in step S404 may be sent to the image processing unit 24.

The image processing unit 24 calculates the position of the recording area in the image obtained with the current orientation on the basis of a change in the orientation of the digital camera 100 from when starting image capture to present. Then, by cropping the recording area from the image data, the image processing unit 24 obtains image data with the same area to be captured as the recording area when starting image capture and stores this in the memory 32. Note that a known technique can be used for the necessary distortion correction and the like to make the region cropped from the circular fisheye image a regular rectangular image.

Note that the image processing unit 24 executes the combining processing of step S407 and the cropping processing of step S408 for both the image data for recording and the image data for display. Also, the image processing unit 24 may execute the necessary distortion correction and the like to make the region cropped from the circular fisheye image a regular rectangular image.

Of the recording area image data obtained by cropping by the image processing unit 24, the image data for recording is stored on the recording medium 90 by the system control unit 50 as wide-angle image data generated in crop mode. Also, the system control unit 50 executes guide display processing in step S409 for the image data for display before outputting this to the display unit 28 or an external apparatus. Note that data of a plurality of frames may be collectively recorded on the recording medium 90 in accordance with the encoding method or the like.

In step S409, the system control unit 50 executes guide display processing. This will be described below in detail.

In step S410, the system control unit 50 determines whether or not an image capture end operation has been performed. When an image capture end operation is determined to have been performed, operations relating to moving image recording end, and when this is not determined, processing on the next frame from step S403 is executed. The image capture end operation may be the operation of a moving image recording switch or an end recording instruction received via the communication unit 54 from an external apparatus.

Next, the operations of the system control unit 50 in step S404 will be described using the flowchart illustrated in FIG. 5.

In step S500, the system control unit 50 obtains the difference between the reference orientation (in this example, the orientation when starting image capture) of the digital camera 100 and the current orientation of the digital camera 100 obtained in step S403. Then, the system control unit 50 calculates the position of the recording area in the image obtained in the current orientation on the basis of the difference in orientation.

Furthermore, the system control unit 50 determines whether or not the recording area corresponding to the current orientation is greater than the capturable area of the currently enabled camera. As illustrated in the example in FIG. 3B, the system control unit 50 detects when the recording area 307 exceeds the capturable area 305 of the enabled rear camera 120 (includes an area not included in the capturable area 305). When the system control unit 50 determines that the recording area corresponding to the current orientation is greater than the capturable area of the currently enabled camera, step S501 is executed, and when this is not determined, step S503 is executed.

In step S501, of the cameras currently disabled, the system control unit 50 enables the camera with a recording area corresponding to the current orientation of the digital camera 100 included in the area to be captured, and the processing of step S404 ends. For example, in the example illustrated in FIG. 3B, the front camera 110 is enabled.

Steps S503 to S508 correspond to processing executed by the system control unit 50 for the cameras of the digital camera 100 that are currently enabled.

In step S504, the system control unit 50 obtains the capturable area.

In step S505, the system control unit 50 determines whether or not the capturable area obtained in step S504 includes at least a portion of the recording area corresponding to the current orientation of the digital camera 100 calculated in step S500. When the system control unit 50 determines that the capturable area includes at least a portion of the recording area, step S506 is executed, and when this is not determined, step S507 is executed.

In step S506, the system control unit 50 keeps the target camera enabled, and the processing of step S404 ends.

In step S507, the system control unit 50 disables the target camera, and the processing of step S404 ends. Being disabled is a state in which less power is consumed than when in an enabled state, and power supply to at least one portion may be continued. For example, the image sensor and the A/D converter may be put in a power saving state. This can also be said to be causing a circuit relating to the disabled imaging lens to be transition to a state in which less power is consumed than when the lens is enabled.

In this manner, the camera required to capture the recording area (in other words, the area to be captured required for image generation) corresponding to the current orientation is enabled, and the camera not required to capture the recording area corresponding to the current orientation is disabled. Accordingly, only the required camera is dynamically enabled in response to a change in the orientation of the digital camera 100, allowing the power consumption to be reduced.

Next, the processing of step S409 will be described in detail using FIGS. 6 and 7. For the sake of convenience, in this example, the digital camera 100 operates in a cooperation mode with the smartphone 200, and the image data for live view display is transmitted to the smartphone 200 via the communication unit 54. Also, with the smartphone 200, an application for cooperating with the digital camera 100 is executed, and a display based on the image data for live view display received from the digital camera 100 performed on the display 205. Also, the user is holding the digital camera 100 and in a state where they can see the display 205 of the smartphone 200. Note that the guide display operation described below may be executed with the digital camera 100 alone if the live view display can be seen via the display unit 28 of the digital camera 100.

Figure 6:
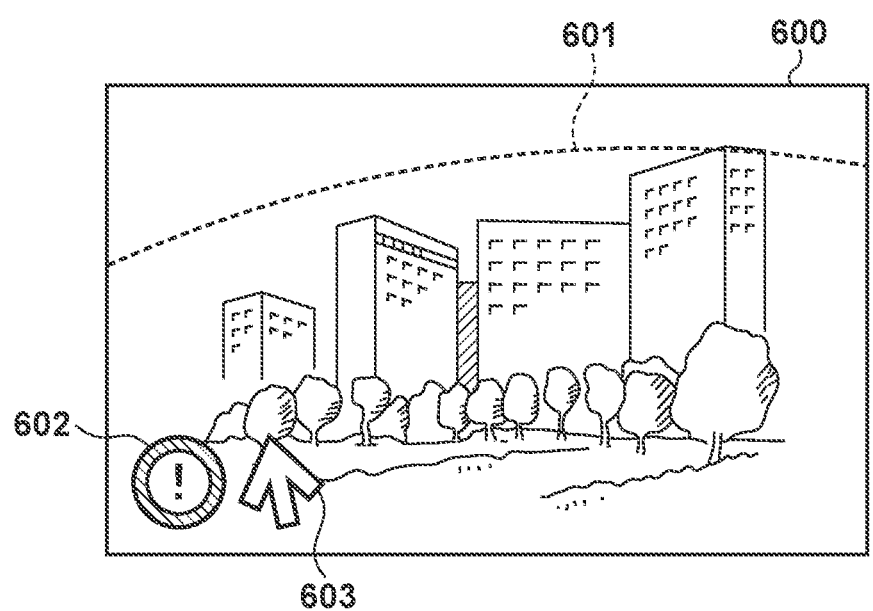
FIG. 6 is a diagram illustrating examples of guide displays according to an embodiment.
Figure 7:
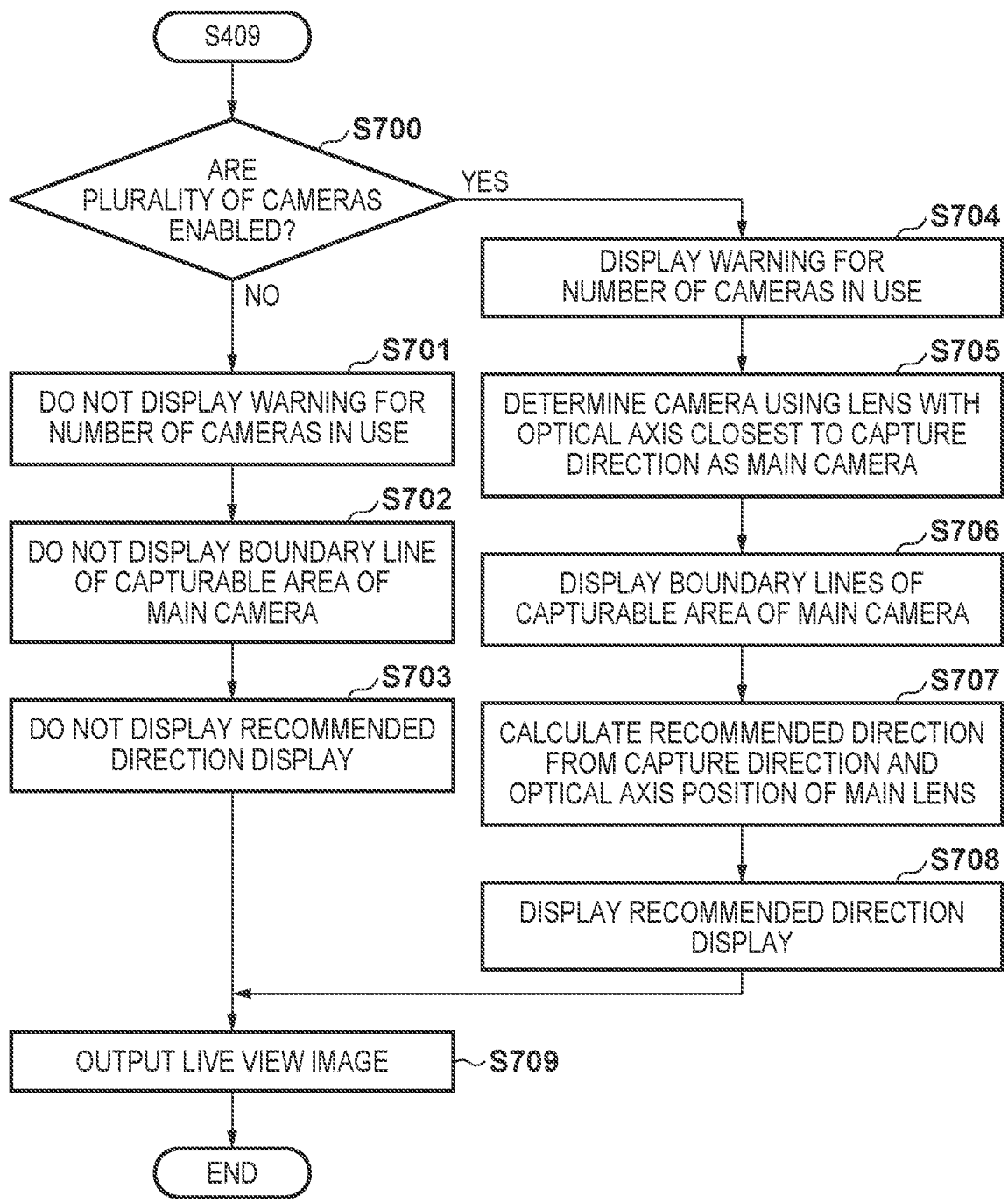
FIG. 7 is a flowchart relating to the operations of a digital camera according to an embodiment.

FIG. 6 is a diagram illustrating a specific example of a guide display executed in step S409. A live view image 600 is displayed on the display 205. The guide display is a predetermined image, such as an indicator, icon, or the like, superimposed on a live view image when a plurality of cameras are enabled. In this example, the guide display includes a boundary line 601, a number of cameras in use warning 602, and a recommended direction display 603.

The boundary line 601 represented by a broken line indicates the boundary of the capturable area of the camera and corresponds to the boundary line 300 in FIGS. 3A and 3B. For the boundary line 601 to be displayed, a plurality of cameras may be required to capture the recording area, as illustrated in FIG. 3B. When one camera can capture the entire recording area, such as in FIG. 3A, the boundary line 601 is not displayed.

The number of cameras in use warning 602 is an icon indicating that a plurality of cameras are being used to capture the recording area. The boundary line 601 and the number of cameras in use warning 602 are both displayed. Note that another representation method, such as using a character string or a line display instead of an icon, may be used.

The recommended direction display 603 is an icon indicating how to change the orientation of the digital camera 100 to reduce the number of cameras required to capture the recording area. Looking at the examples illustrated in FIGS. 3A and 3B, to change the orientation of FIG. 3B to the orientation of FIG. 3A, the digital camera 100 can be changed to almost an upright orientation. In this case, the recommended direction display 603 can be an icon representing the upright direction (direction to make the digital camera 100 upright). More specifically, the current orientation and the recommended orientation may be alternately displayed, or animation may be used in the display.

When the guide display requirements are met, the digital camera 100 (system control unit 50) uses the image processing unit 24 to generate a live view display image with the guide display superimposed.

Next, the operations of the system control unit 50 in step S409 will be described using the flowchart illustrated in FIG. 7.

In step S700, the system control unit 50 determines whether or not a plurality of cameras are enabled. When it is determined that a plurality of cameras are enabled, step S704 is executed, and when this is not determined, step S701 is executed.

In step S701, the system control unit 50 sets the number of cameras in use warning 602 to not be displayed.

In step S702, the system control unit 50 sets the boundary line 601 to not be displayed.

In step S703, the system control unit 50 sets the recommended direction display 603 to not be displayed. The system control unit 50 notifies the image processing unit 24 of the settings of steps S701 to S703.

Note that all of the guide displays (the boundary line 601, the number of cameras in use warning 602, and the recommended direction display 603) may be collectively set to not be displayed.

In step S704, the system control unit 50 sets the number of cameras in use warning 602 to be displayed.

In step S705, the system control unit 50 calculates the difference in angle between the optical axis direction and the capture direction for each enabled camera and sets the camera with the smallest difference in angle as the main camera.

In step S706, the system control unit 50 sets the boundary line 601 of the capturable area of the main camera to be displayed.

In step S707, the system control unit 50 calculates the direction to orientate the digital camera 100 to reduce the difference in angle between the optical axis direction and the capture direction of the main camera.

In step S708, the system control unit 50 sets the recommended direction display 603 to be displayed. The system control unit 50 notifies the image processing unit 24 of the settings of steps S704, S706, and S708 and the direction calculated in step S707.

In step S709, the image processing unit 24 generates image data for live view display on the basis of the notification from the system control unit 50.

When steps S701 to S703 are executed, the image processing unit 24 generates image data for normal live view display without a guide display superimposed.

On the other hand, when steps S704 to S708 are executed, the image processing unit 24 generates image data for live view display with a guide display superimposed. Note that for the guide displays, the superimposition position of the number of cameras in use warning 602 and the recommended direction display 603 and the image for the recommended direction display 603 corresponding to the notified direction are predetermined. Also, regarding the image data for live view display, the image processing unit 24 superimposes the boundary line 601 at the position corresponding to the boundary of the plurality of images used to generate a combined image in step S407.

Then, the image processing unit 24 stores the generated image data for live view display in the memory 32. The system control unit 50 transmits the image data for live view display to the smartphone 200 via the communication unit 54. The system control unit 50 can also output the image data for live view display to the display unit 28.

As described above, according to the present embodiment, with an image capture apparatus that can generate an omnidirectional image using a plurality of image capture units, when generating an image with a smaller field of view than an omnidirectional image, only the image capture unit required for image generation are enabled. Also, when image stabilization cannot be implemented in the capturable area of an enabled image capture unit, the required image capture unit is enabled. Thus, power consumption can be reduced, and the area in which image stabilization can be performed can be increased.

Other Embodiments

In the configuration of the embodiment described above, a single image capture unit uses a single imaging lens. However, in the configuration of other similar embodiments, the number of imaging lenses used by a single image capture unit can be changed. In this case, image capture using a plurality of lenses may be performed sequentially while switching lenses. Also, operation relating to enabling and disabling the cameras in the embodiment described above is synonymous with enabling and disabling the lenses. A configuration in which the number of lenses used is increased in response to a change in the orientation of the digital camera achieves less of the effect of reducing power consumption compared to a configuration in which the number of image capture units used is increased but achieves a similar effect regarding an increase in the area where image stabilization can be performed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-041763, filed on Mar. 16, 2022, which is hereby incorporated by reference herein in its entirety.

What is claimed is:

1. An image capture apparatus that generates an omnidirectional image using a plurality of image capture units with different capture directions, the plurality of image capture units respectively including a plurality of imaging lenses, the image capture apparatus comprising:
   one or more processors; and
   a memory storing a program which, when executed by the one or more processors, causes the image capture apparatus to;
   (1) execute detecting processing to detect an orientation of the image capture apparatus;
   (2) execute identifying processing to, when the image capture apparatus is in an operation mode for generating a first image with a smaller field of view than the omnidirectional image, (a) identify a reference orientation which is a unidirectional direction that is not affected by changes to the orientation of the image capture apparatus thereafter and (b) identify a first area to be captured required to generate the first image on a basis of a difference between the reference orientation and a current orientation of the image capture apparatus detected by the detecting processing;
   (3) execute control processing to, when the image capture apparatus is in the operation mode, (a) in a case where a capturable area of a first image capture unit, from among the plurality of image capture units, includes at least a portion of the first area, put the first image capture unit in a first state capable of imaging processing and (b) in a case where a capturable area of a second image capture unit, from among the plurality of image capture units, does not include any portion of the first area, put the second image capture unit in a power saving state in which less power is consumed than when in the first state; and (4) execute generating processing to generate a guide display including a display indicating how to change the orientation of the image capture apparatus to reduce a number of imaging lenses to be used for image capture.

2. The image capture apparatus according to claim 1, wherein in the generating processing, the first image is generated by cropping a region of the first area from an image obtained using an imaging lens, from among the plurality of imaging lenses, image capture using that imaging lens having been enabled by the control processing.

3. The image capture apparatus according to claim 2, wherein the program, when executed by the one or more processors further causes the image processing apparatus to execute combining processing to generate a combined image by stitching together images captured using the plurality of imaging lenses when image capture using each one of the plurality of imaging lenses is enabled in the control processing, and
wherein in the generating processing, the first image is generated by cropping the region of the first area from the combined image.

4. The image capture apparatus according to claim 3, wherein in the generating processing, the guide display is superimposed with the first image.

5. The image capture apparatus according to claim 4, wherein the guide display further includes (a) a display indicating a boundary between a plurality of images used to generate the combined image or (b) a display indicating that image capture by the plurality of imaging lenses is enabled.

6. The image capture apparatus according to claim 2, wherein the first image generated in the generating processing is output to a display apparatus included in the image capture apparatus or to an external apparatus including a display apparatus.

7. The image capture apparatus according to claim 1, wherein the identifying processing identifies the first area by converting a position of an area to be captured when the image capture apparatus is in the reference orientation to a position corresponding to the current orientation of the image capture apparatus.

8. The image capture apparatus according to claim 1, wherein the control processing causes a circuit relating to an imaging lens, image capturing using which is disabled, to be transition to a state in which less power is consumed than when image capturing using that imaging lens is enabled.

9. The image capture apparatus according to claim 8, wherein the circuit includes an image sensor.

10. The image capture apparatus according to claim 1, wherein the program causes the image capture apparatus to perform the identifying processing and the control processing repeatedly.

11. The image capture apparatus according to claim 1, wherein the plurality of imaging lenses are circular fisheye lenses.

12. A control method for an image capture apparatus that can generate an omnidirectional image using a plurality of image capture units with different capture directions, the plurality of image capture units respectively including a plurality of imaging lenses, the method comprising:
    detecting an orientation of the image capture apparatus;
    when the image capture apparatus is in an operation mode for generating a first image with a smaller field of view than the omnidirectional image, (a) identifying a reference orientation which is a unidirectional direction that is not affected by changes to the orientation of the image capture apparatus thereafter and (b) identifying a first area to be captured required to generate the first image on a basis of a difference between a reference orientation and a current orientation of the image capture apparatus detected in the detecting;
    when the image capture apparatus is in the operation mode, (a) in a case where a capturable area of a first image capture unit, from among the plurality of image capture units, includes at least a portion of the first area, putting the first image capture unit in a first state capable of imaging processing and (b) in a case where a capturable area of a second image capture unit, among the plurality of image capture units, does not include any portion of the first area, putting the second image capture unit in a power saving state in which less power is consumed than when in the first state; and
    generating a guide display including a display indicating how to change the orientation of the image capture apparatus to reduce a number of imaging lenses to be used for image capture.

13. A non-transitory computer-readable medium storing a program which, when executed by one or more processors of an image capture apparatus that can generate an omnidirectional image using a plurality of image capture units with different capture directions, the plurality of image capture units respectively including a plurality of imaging lenses, causes the image capture apparatus to perform a control method comprising:
    detecting an orientation of the image capture apparatus;
    when the image capture apparatus is in an operation mode for generating a first image with a smaller field of view than the omnidirectional image, (a) identifying a reference orientation which is a unidirectional direction that is not affected by changes to the orientation of the image capture apparatus thereafter and (b) identifying a first area to be captured required to generate the first image on a basis of a difference between a reference orientation and a current orientation of the image capture apparatus detected in the detecting;
    when the image capture apparatus is in the operation mode, (a) in a case where a capturable area of a first image capture unit, of the plurality of image capture units, includes at least a portion of the first area, putting the first image capture unit in a first state capable of imaging processing and (b) in a case where a capturable area of a second image capture unit, of the plurality of image capture units, does not include any portion of the first area, putting the second image capture unit in a power saving state in which less power is consumed than when in the first state; and
    generating a guide display including a display indicating how to change the orientation of the image capture apparatus to reduce a number of imaging lenses to be used for image capture.

* * * * *